May 19, 1970   KIYOSHI INOUE ETAL   3,512,212
SPRING HINGE
Filed Aug. 19, 1968                    4 Sheets-Sheet 1

INVENTOR.
Kiyoshi INOUE
Shigeru Kasuya

United States Patent Office 3,512,212
Patented May 19, 1970

3,512,212
SPRING HINGE
Kiyoshi Inoue and Shigeru Kasuya, Tokyo, Japan, assignors to Nippon Electric Industry Co. Ltd., Tokyo, Japan, a corporation of Japan
Filed Aug. 19, 1968, Ser. No. 753,637
Int. Cl. E05f 1/12
U.S. Cl. 16—189          15 Claims

ABSTRACT OF THE DISCLOSURE

A spring hinge having three concentrically mounted elements and a transmission means mounted in the intermediate element such that during a first portion of operation of said hinge two springs are twisted, and during further operation of the hinge only a single spring is twisted. Thereby, a large door closing torque is provided for relatively small angular openings thereof and relatively low forces are required to open the door to its maximum open position.

---

This invention relates to automatic door closing devices which function to automatically close a door utilizing the restoring force caused by stressing one or more springs.

In the existing devices of this kind utilizing one or more springs, the magnitude of the restoring force increases proportionally to the angular opening of the door. Thus, the door closing torque is low for small angular openings thereof and the door is often not closed, depending on the degree of slipping resistance caused by the door latch and others.

When large-sized spring hinges are used to develop torques of high enough magnitude to close the door completely at the range close to the position of door closure (i.e. for small angular openings), the twisting displacement to be applied to the spring greatly increases at the maximum angular opening position of the door and the restoring force thereof also becomes very large in magnitude. Thus, excessively high forces are applied to the various components of the door and hinge, resulting not only in the requirement for heavy duty parts, but also in an increase in the force required for opening the door.

Therefore, the object of this invention is to provide a spring hinge which provides a large enough torque to completely close the door for small angular openings thereof and which requires relatively low forces to open the door to its maximum open position.

SUMMARY OF THE INVENTION

According to this invention, a spring hinge includes an outside element, an intermediate element mounted concentrically with the outside element and an inside element mounted concentrically with the outside and intermediate elements. Further provided are first and second spring means connected between the inside element and the outside element, and between the intermediate element and the outside element, respectively. A transmission means which includes a movable element is mounted in the intermediate element to substantially prevent relative movement between the inside and intermediate elements during a first portion of operation of the hinge, thereby causing both the first and second spring means to be twisted during the first portion of operation of the hinge. The transmission means also substantially prevents relative movement between the intermediate and outside elements during further operation of the hinge such that only the first spring means is twisted during further operation of the hinge.

Figure 1:
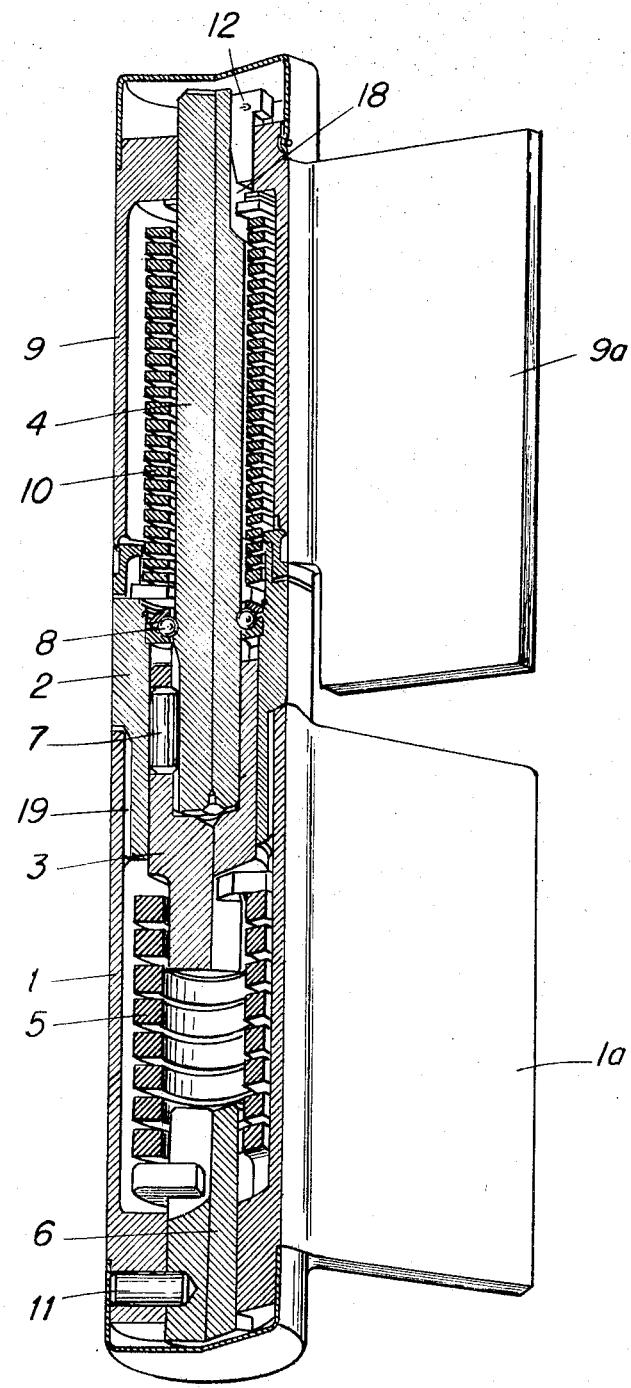
Figure 2:
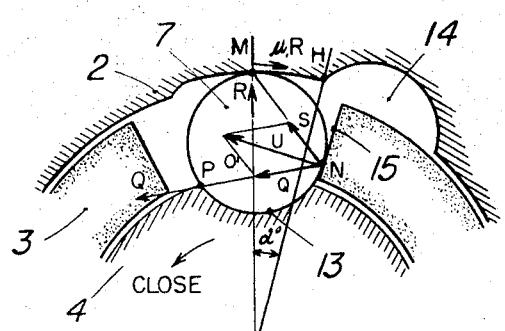
Figure 3:
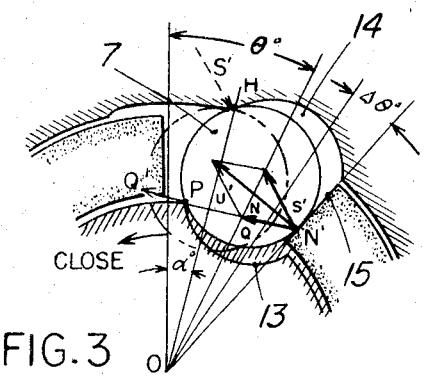
Figure 4:
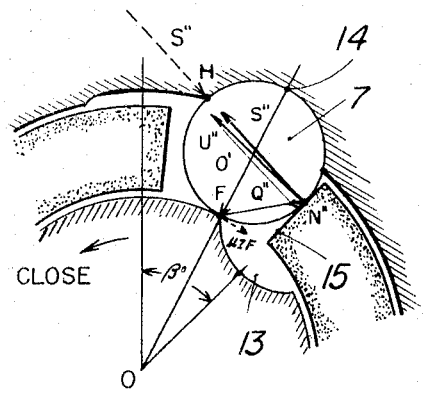
Figure 9:
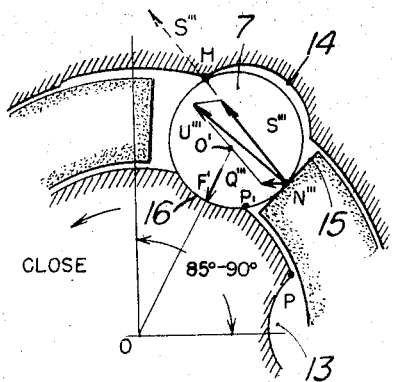
Figure 10:
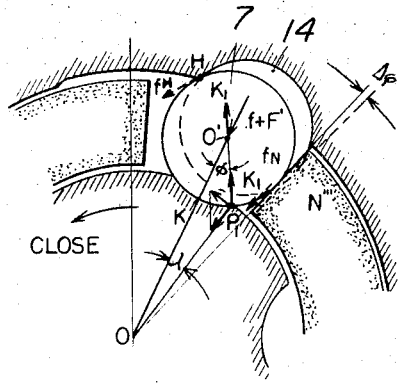
Figure 11:
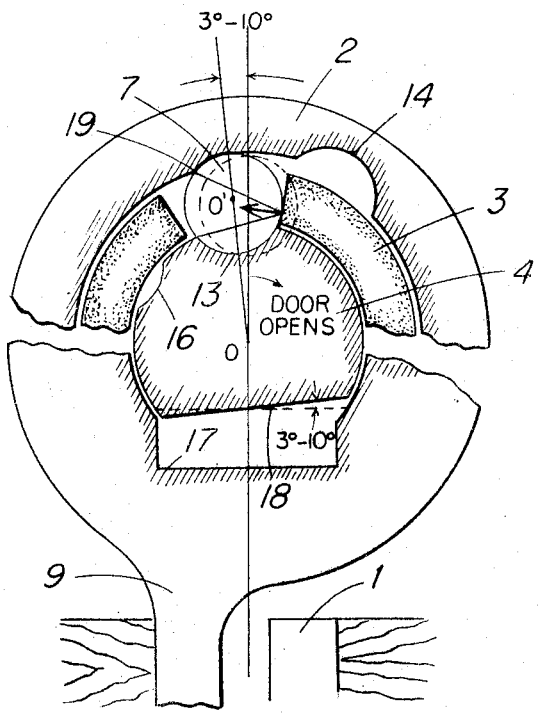

Other objects and various features of this invention will become apparent in view of the following description taken in conjunction with the accompanying drawings, wherein:

FIG. 1 is a partly broken-away perspective view;
FIGS. 2, 3 and 4 illustrate in detail the changing-over mechanism of springs;
FIGS. 5a, 5b, 5c, 5d, 6 and 7 are the graphs indicating the characteristic values of a particular embodiment of this invention;
FIGS. 8, 8a, 8b and 8c are the views comparing the characteristics of the changing-over mechanism;
FIGS. 9 and 10 illustrate the door stopping mechanism in detail; and
FIG. 11 is a view of the pre-setting mechanism.

Referring to FIG. 1, a roller seat 2 is inserted into a lower outside sleeve 1, guided by circumferential serrations 19 made on the outside surface of said roller seat 2 and on the inside surface of said sleeve 1. Sleeve 1 has a wing 1a, either secured thereto or made as a part thereof, which is connected to a pillar, door jamb or the like. A shaft 4 is inserted into a roller retainer 3 which in turn is mounted in roller seat 2. Shaft 4 has a groove 13 (see FIG. 2) therein and a flatted upper portion 18 (see FIG. 11). A heavy spring 5, one end of which is connected to the roller retainer 3 and the other end of which is connected to the milled part of a spring setting shaft 6, is provided at the inside of lower outside sleeve 1. Spring setting shaft 6 is secured within the lower end of sleeve 1 by means of a pin 11.

The roller retainer 3 has two separately located windows, each of which contains a roller 7. The thrust balls 8 are put in between the roller retainer 3 and the shaft 4 as shown in FIG. 1 to receive the thrust and radial loads caused by the door weight. Further provided is an upper outside sleeve 9 having a wing 9a to be fitted to the door. Upper sleeve 9 is connected to lower outside sleeve 1 by shaft 4 and the thrust load caused by the door weight is applied to the pillar via the shaft 4, the thrust balls 8 and the roller seat 2.

Contained inside the upper outside sleeve 9 is a light spring 10, one end of which is connected to the roller seat 2 and the other end of which is connected to shaft 4, which is maintained in position by square key 12. The heavy and light springs 5 and 10 are adjusted by means of twisting the springs and then setting the spring setting pin 11 and square key 12. The remaining structural elements of FIG. 1 which do not carry reference numerals are not discussed herein since it is believed that the design of these elements is easily carried out by one ordinarily skilled in the art within the spirit of this invention.

FIG. 2 is a sectional view of the roller 7 and the portions of the hinge in proximity thereto in the position of door closure. In this condition, roller 7 completely sinks into a groove 13 provided on the shaft 4 and the circumference of roller 7 contacts the side surface 15 of one of the windows provided in retainer 3 at the point N. Roller 7 receives the restoring force U transmitted from one end of the heavy spring 5, one component Q of the restoring force U being directed to one end P of groove 13 provided on shaft 4 and the component S of the restoring force U being directed to a point M where roller 7 contacts roller seat 2 to tend to push roller 7 outward in the radial direction. However, no outward displacement of roller 7 is allowed as the inside surface of roller seat 2 contacts with the roller 7 circumference. Thus the latter component S acts as a pushing force R. In the event that the frictional force $\mu_1 R$ between roller 7 and roller seat 2 is considered to be negligible ($\mu_1 xR \to 0$), the door closing torque acting on the upper outside sleeve 9 is large in magnitude since the torque is a resultant of the restoring forces of the heavy and light springs 5 and 10, respectively, combined through shaft 4.

When the door is opened from this closed position, shaft 4, roller 7 and roller retainer 3 move along the inner surface of roller seat 2 keeping roller 7 in groove 13 and between shaft 4 and roller seat 2. Until the arrival of roller 7 at contacting point H (at corner H of the groove 14 provided on the inside surface of roller seat 2) where the operand angle of the door is $\alpha°$, the door closing torque increases linearly proportional to the opened angle of the door since the restoring torque developed is proportional to the combined twisted displacement of the heavy and light springs 5 and 10, respectively. Once the roller 7 starts to pass point H (reference is now made to FIG. 3), it gradually enters into groove 14 of roller seat 2 by the action of the above-mentioned radial force R.

Referring to FIG. 4, when the door is further opened to the position where the opened angle of the door is $\beta°$, the center point O' of roller 7, one end P of groove 13 provided on said shaft 4, and the longitudinal center axis O of shaft 4 become aligned. Then, roller 7 moves completely out of groove 13 of shaft 4 and contacts with the circumference of shaft 4. The roller 7 is now held between the outer surface of shaft 4, the concaved surface of groove 14 provided on roller seat 2, and the side surface 15 of the window provided on roller retainer 3, substantially only receiving the force F which is centripetally directed to the roller center. In this condition, the restoring force of heavy spring 5 does not directly affect the door closing torque. Only the restoring force of light spring 10 acts as the door closing torque in the range of door opening angles beyond this point (i.e., door opening angles greater than $\beta°$), and the frictional froce ($\mu_2 F$) formed by the above-mentioned centripetal force F acts as the loss torque (this part is identified by C in FIG. 7). The door closing torque now becomes smaller than for angles less than $\beta°$ during further movement of the roller 7 as the door is opened further, since the word done per unit angle of the angular opening decreases, although the restoring force of the heavy spring 5 increases ($U < U' < U''$) as the roller 7 moves radially outward.

Figure 7:
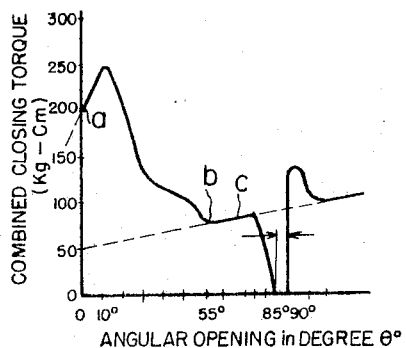

FIG. 7 is a graphical representation of the relationship between the angular opening of the door and the door closing torque. In the graph, the ordinate shows the door closing torque and the abscissa shows the angular opening. The part between two points marked by $a$ and $b$ on a broken line shows the resultant torque provided by the heavy and light springs. On the torque curve shown in FIG. 7, the angular opening $\alpha°$ represents the included angle between the position of door closure and the position wherein the contact point M arrives at the end H of groove 14 on roller seat 2. The angular opening $\beta°$ likewise represents the included angle between the position of door closure and the point where the axis line O' of the shaft 4, one end P of the groove 13 on shaft 4 and the center axis line of roller 7 coincide on a line as illustrated in FIG. 4.

Although the reason for the nature of the torque magnitude between the range of $a$ and $b$ as shown in FIG. 7 has been already simply described relating to the movement of roller 7, further details will now be explained. Indicating the point where the restoring force of the heavy spring 5 acts on the roller retainer 3 when the door is opened to the angle of $\alpha°$ as N, as shown in FIG. 2 (the corresponding position of the roller is shown by the two-dot chain line in FIG. 3), a further twisting of the shaft 4 by the opening of the door to the position as shown in FIG. 3 will shift the point N to the other point N', which corresponds to an incremental angular displacement $\Delta\theta°$ in the portion of point N. This means that heavy spring 5 is twisted by $\Delta\theta°$ and the restoring force increases accordingly ($U < U'$). FIG. 3 explains the condition of the region including the roller when the angular opening is $\theta°$, and corresponds to the condition in which the angular opening is less than $\beta°$. The conditions when the door is opened to the angle of $\beta°$ are shown in FIG. 4. In the condition of FIG. 3, the light spring 10 makes the restoring force increase or decrease linearly proportional to the angular opening of the door, and the door closing torque accordingly varies in the same way (reference is made to FIG. 6), since light spring 10 is directly connected to the roller seat 2 and the shaft 4 at its ends. Therefore, the discussion on the torque transmission mechanism for the heavy spring only is enough to examine the decreasing nature of the door closing torque in this range.

Referring to FIG. 3 now, the work received by heavy spring 5 when twisted by $\Delta\theta°$ (assuming that $\Delta\theta°$ is very small and not considering the frictional force) is as follows:

$$\frac{(U'.oN') + (U.oN)}{2} \times \Delta\theta°$$

$$= \frac{[(Cs.\Delta\theta° + I_0) + I_0] + I_0}{2} \times \Delta\theta°$$

(1)

The work given to heavy spring 5 for twisting heavy spring 5 by $\Delta\theta°$ via the shaft 4 is:

$$Im \times (\theta° - \alpha°) \qquad (2)$$

Since Equation 1 must be equal to Equation 2, $$Im(\theta° - \alpha°) = \frac{[(Cs.\Delta\theta° + To) + To]}{2} \times \Delta\theta°$$

Then:

$$Im = \frac{\Delta\theta°[(Cs.\Delta\theta° + To) + To]}{2(\theta° - \alpha°)}$$

where, $Cs$ = rotational spring constant of heavy spring 5 in kg.-cm./degree;
$To$ = restoring torque (kg.-cm.) of the heavy spring 5 for the angular opening of $\alpha°$;
$\Delta\theta°$ = twisted angle of the heavy spring 5 in degrees; and
$Im$ = average door opening torque (kg.-cm.) to be generated when the door is opened to the angle of $\theta°$.

Figure 5A:
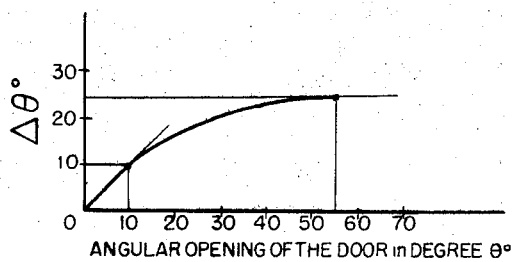
Figure 5B:
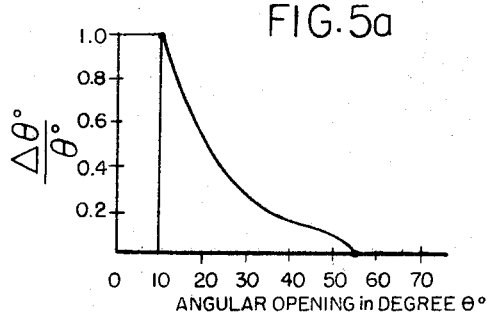
Figure 5C:
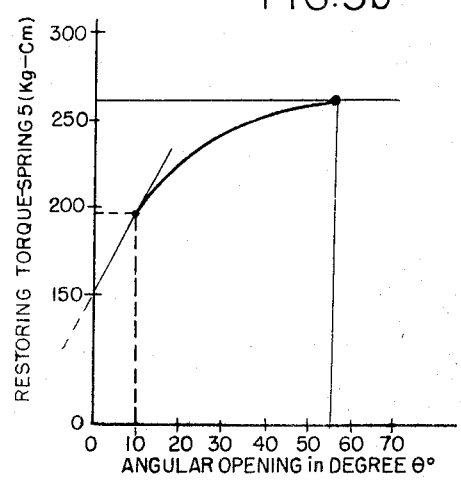
Figure 5D:
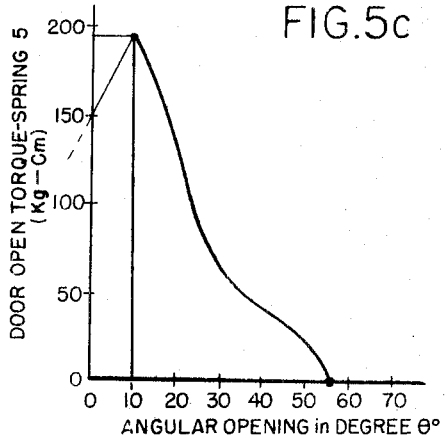
Figure 6:
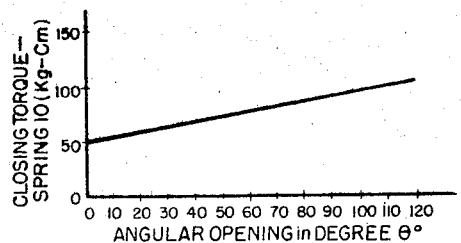
Figure 8:
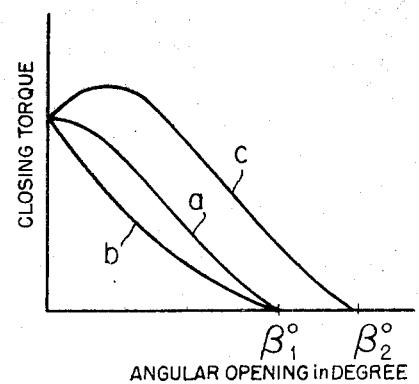

As a result, the door closing torque caused by the heavy spring 5 is found to be proportional to $\Delta\theta°/(\theta° - \alpha°)$, while for the range of the angular opening wider than $\beta°$, the restoring force caused by the heavy spring 5 does not act as the door closing torque at all and merely exists as internal energy. The values of $\Delta\theta/(\theta° - \alpha°)$ for an embodiment according to this invention, are illustrated in FIG. 5a and the corresponding door closing torques are illustrated in FIG. 5d. FIG. 7 shows the resultant characteristic curve produced by the combination of the torque curve in FIG. 5d and the torque curve of the light spring 10 in FIG. 6. Since no consideration has been made for the frictional forces in the above discussion, about 80% of those values are taken as the respective actual door torques.

Figure 8A:
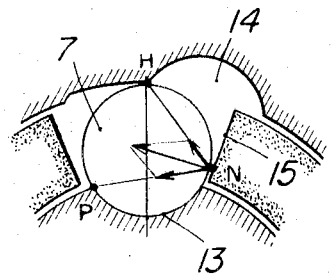
Figure 8B:
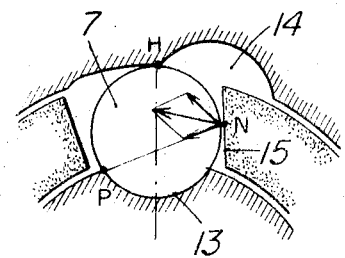
Figure 8C:
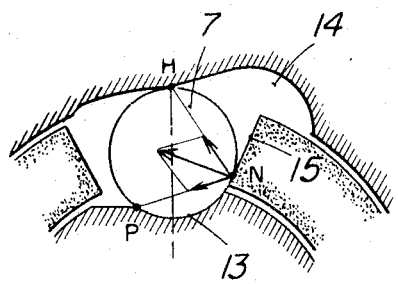

Further, regarding the torque transmission system for the heavy spring 5 in the spring hinge according to this invention, different characteristics of the door closing torque are easily obtained by changing the relations of the acting point of force on the circumference of the roller 7 as illustrated in FIGS. 8a, 8b and 8c. These modifications provide varying characteristics and can be implemented by those ordinarily skilled in the art.

Moreover, the embodiment according to this invention also contains a stopping mechanism to enable the door to stay open when opened to a position of about 85°–90°.

FIG. 9 shows a sectional view of the portion of the hinge including the roller 7 in the condition where the door is held at an open angle of about 85°–90°. The shaft 4 is turned clockwise more than its position shown in FIG. 4 and the roller 7 is pushed into a shallow groove 16, which is provided on shaft 4, by a centripetal force F' which is caused by the restoring force of the heavy spring 5. In this case, the restoring force $U'''$ of the heavy spring 5 is slightly smaller than the restoring force U″ which exists when the roller 7 contacts the circumference of shaft 4 (corresponding with the condition shown in FIG. 4), since the roller 7 sinks into the shallow groove 16 provided on shaft 4 (U‴<U″). Even in this case, the restoring force of the heavy spring 5 does not act as the door closing torque because an end $P_1$ exists on the shallow groove 16, and only the restoring force of the light spring 10 acts as the door closing torque. However, in order to close the door turning counter-clockwise from the position of FIG. 9, the roller 7 has to be pushed out radially so that the roller 7 may contact the circumference of the shaft 4. When the work necessary for pushing out the roller 7 from the shallow groove 16 can be done by the restoring force provided by the light spring 10, the shaft 4 does not stop in this position and the force of the light spring 10 continues the door closing movement. But, when the work necessary for pushing out the roller is larger than said restoring force of the light spring 10, the shaft 4 stops in this condition, thus providing the stopping mechanism to keep the door open at stop position.

In order to close the door from this stop position, an external force in the direction of door closure must be given to the shaft 4 via the door to push out the roller 7. This operation will be simply explained below referring to FIG. 10. The force which must be overcome when pushing out the roller 7 is the resultant force $(f+F')$ which is the combination of the centripetal force F′, frictional force developed at one end H of the roller seat groove 14 and the frictional force generated at the contact point N‴ of the roller retainer 2 with the roller 7. Since the roller 7 is pushed out by a component $K_1$ of the door closing force K applied from one end $P_1$ of the shallow groove 6 provided on the shaft 4, the following Equation 1 must exist:

$$K_1 \cdot \cos \phi \geq f + F' \quad (1)$$

where, $$K_1 = K/\sin (\lambda + \phi) \quad (2)$$

Putting Eq. 2 into Eq. 1, $$K/\sin (\lambda + \phi) \cdot \cos \phi \geq f + F'$$

Therefore:

$$K \geq (f + F') \cdot \sin (\lambda + \phi)/\cos \phi$$

From the last equation, $K-Kb$ (where $Kb$ is the restoring force of the light spring applied at the point $P_1$) will be equivalent to the external force to be applied to the shaft 4 through the door or the above mentioned locking force, by selection of the magnitude of $\lambda$ and $\phi$ so as to make $K>Kb$.

Thus, according to the invention as above mentioned, the stopping mechanism is contained in the device itself based on the equilibrium relation of the forces provided by the heavy 5 and light 10 springs in the spring hinge. The inclusion of the stop mechanism does not impart unreasonable construction problems. Also, the defects of the present-day products, such as the generation of abnormal noise and the instability of the locking force during holding the door at the stop position are completely eliminated. Further, since the operation to give the initial twisting to the springs is usually done after the hinge wings are solidly fixed to the pillar and to the door, installation of the hinge according to the invention is facilitated regardless of where the hinge is installed.

When initially adjusting the hinge according to this invention, the shaft 4 is located at 3°–10° beyond the position of door closure, thereby keeping the light spring 5 in a twisted condition. In that position the roller 7 strikes against the wall 19 formed by providing a small depth step in the inner diameter of the roller seat 2, to prevent further movement in the counter-clockwise direction. As long as the condition is maintained that the restoring force of the heavy spring 5 caused by its twisting is applied to the roller 7 from the roller retainer 3, the roller 7 cannot move easily in the direction to open the door and is pushed to the inside wall of the roller seat 2 and the shaft 4 also continues the preceding condition simultaneously. Then, the magnitude of twisted displacement of the heavy 5 and light springs 10 is set so as to provide the magnitude of the door closing torque required to close the door satisfactorily. At the time of installing the door, an attached square key is driven into the space between the keyway 17 provided in the upper outside sleeve 9 and the milled surface 18 of the shaft 4 while placing the door in the closed position. When the shaft 4 is turned 3°–10° in the clockwise direction as shown in the broken line, the roller 7 likewise turns 3°–10° in the same direction to take the position shown in the broken line in FIG. 11. This condition is entirely same as that shown in FIG. 2 and the door closing torque to close the door satisfactorily is transmitted to the door through the shaft 4. For ease of explanation, only portions of FIG. 11 are shown as being moved by 3°–10°. It should be clear that portions 9 and 3, as well as other members also move 3°–10°.

As above mentioned, the spring hinge according to this invention adopts the mechanism (pre-set mechanism) which is able to keep the springs in twisted condition prior to shipment from the plant and allows for an adjustment to provide satisfactory door closing torques by only driving an attached square key.

From the explanations described hereinbefore, the spring hinge according to this invention is understood to be very beneficial in practice because it has the novel characteristics of door closing torque which have not been obtained by the existing ones and contains the door stopping mechanism and the pre-set mechanism in itself.

What is claimed is:

1. A spring hinge comprising:
   an outside element (2) defining a hinge axis;
   an intermediate element (3) mounted concentrically with said outside element (2);
   an inside element (4) mounted concentrically with said outside and intermediate elements;
   first spring means (10) connected between said inside element (4) and said outside element (2);
   second spring means (5) connected between said intermediate element (3) and said outside element (2);
   transmission means including a movable element (7) mounted in said intermediate element and engageable with said inside element during a first portion of operation of said hinge in a given direction (3) to substantially prevent relative movement between said inside and intermediate elements such that both said first and second spring means are stressed during said first portion of operation of said hinge, said movable element (7) being engageable with said outside element during further operation of said hinge in said given direction to substantially prevent relative movement between said intermediate and outside elements such that only said first spring means is stressed during said further operation of said hinge.

2. A spring hinge according to claim 1 wherein said elements are generally cylindrical, wherein said intermediate element (3) is mounted at least partially within said outside element (2) and wherein said inside element (4) is mounted at least partially within said intermediate element (3).

3. A spring hinge according to claim 1 wherein said movable element (7) is movable in a radial direction and in a circumferential direction.

4. A spring hinge according to claim 3 wherein said movable element (7) is mounted in a window in said intermediate element (3), and wherein the restoring force of said second spring on said intermediate element (3) provides a radial force on said movable element (7) to bias said movable element outward in a radial direction.

5. A spring hinge according to claim 4 wherein said movable element (7) is an elongated roller (7).

6. A spring hinge according to claim 5 wherein said transmission means further includes:
a first groove (13) in said inside element (4) for selectively engaging said roller (7); and
a second groove (14) in said outside element (2) for selectively engaging said roller (7).

7. A spring hinge according to claim 6 wherein:
said roller (7) is engaged in said first groove (13) during said first portion of operation of said hinge and during a portion of said further operation; and
said roller (7) is engaged in said second groove (14) during the latter portion of said first portion of operation during said further operation.

8. A spring hinge according to claim 6 wherein said inside element (4) has a third groove (6) formed on the outside surface thereof for engaging said roller (7) during the latter portion of said further operation of said hinge for maintaining said hinge in a predetermined position.

9. A spring hinge according to claim 1 further comprising:
first means connecting said inside element (4) to a door; and
second means connecting said outside element (2) to a pillar, door jamb, or the like.

10. A spring hinge according to claim 9 wherein:
said first connecting means includes a first housing portion (9, 9a) connected to said inside element (4) and to said door; and
said second connecting means includes a second housing portion (1, 1a) connected to said outside element (2) and to said door jamb or the like.

11. A spring hinge according to claim 10 wherein matching serrations (19) are provided on said outside element (2) and on said second housing portion (1, 1a) for connecting said outside element (2) and said second housing portion together.

12. A spring hinge according to claim 1 wherein said second spring means (5) provides a higher restoring force than said first spring means (10).

13. A spring hinge having a number of generally cylindrical coaxially mounted elements characterized in that:
an inside element (4) having a first groove (13) formed on the outside surface thereof is mounted at least partially within an intermediate element (3) which has a window formed therein;
said intermediate element (3) is mounted at least partially within an outside element (2) which has a second groove (14) formed on the inside surface thereof;
a first spring (10) is connected between said inside element (4) and said outside element (2);
a second spring (5) is connected between said intermediate element (3) and said outside element (2);
an elongated roller (7) is mounted in said window of said intermediate element (3), the restoring force of said second spring (5) on said intermediate element (3) providing a radial force on said roller (7) to bias said roller (7) outward in a radial direction, said roller (7) being engaged in said first groove (13) during a first portion of operation of said hinge to substantially prevent relative movement between said inside and intermediate elements (4 and 3, respectively) so that both said first and second springs (10 and 5, respectively) are stressed, and said roller (7) being engaged in said second groove (14) during further operation of said hinge to substantially prevent relative movement between said intermediate and outside elements (3 and 2, respectively) so that only said first spring (10) is stressed.

14. A spring hinge according to claim 13 further comprising:
first means connecting said inside element (4) to a door; and
second means connecting said outside element (2) to a pillar, door jamb, or the like.

15. A spring hinge according to claim 13 wherein said inside element (4) has a third groove (16) formed on the outside surface thereof for engaging said roller (7) during the latter portion of said further operation of said hinge for maintaining said hinge in a predetermined position.

References Cited
UNITED STATES PATENTS

| | | | |
|---|---|---|---|
| 1,194,628 | 8/1916 | Hist | 16—188 |
| 340,790 | 4/1886 | Waldorf et al. | 16—188 |

BOBBY R. GAY, Primary Examiner

D. L. TROUTMAN, Assistant Examiner